United States Patent [19]
Bujard et al.

[11] Patent Number: 5,344,635
[45] Date of Patent: Sep. 6, 1994

[54] FILLER FOR HEAT-CONDUCTIVE PLASTICS MATERIALS

[75] Inventors: Patrice Bujard, Courtepin; Ileana Cojanu, Pully, both of Switzerland

[73] Assignee: Ciba-Geigy Corporation, Ardsley, N.Y.

[21] Appl. No.: 11,930

[22] Filed: Feb. 1, 1993

[30] Foreign Application Priority Data

Feb. 7, 1992 [CH] Switzerland ............... 380/92

[51] Int. Cl.$^5$ ........................... C01B 21/072
[52] U.S. Cl. .................. 423/412; 423/353; 523/220; 524/428; 524/439; 524/786
[58] Field of Search .............. 523/220; 524/428, 439, 524/786; 423/412, 353

[56] References Cited

U.S. PATENT DOCUMENTS 4,764,489 8/1988 Bolt ........................ 501/96

FOREIGN PATENT DOCUMENTS 382188 8/1990 European Pat. Off. .

OTHER PUBLICATIONS

Derwent Publications Ltd, London AN90-063284.
Derwent Publications Ltd, London AN92-061825.

*Primary Examiner*—Paul R. Michl
*Assistant Examiner*—U. K. Rajguru
*Attorney, Agent, or Firm*—Kevin T. Mansfield; George R. Dohmann

[57] ABSTRACT

A powder mixture of aluminium nitride in the form of sintered agglomerates with fractions of different particle size, which mixture comprises (1) 80 to 50% by weight of aluminium nitride in the form of sintered agglomerates having a mean particle diameter of 30 to 50 μm, and (2) 20 to 50% by weight of aluminium nitride in the form of unsintered particles and having a mean particle diameter of 0.1 to 5 μm. The mixture is suitable for use as filler for polymer materials, especially for casting resins, from which moulded parts of high thermal conductivity can be fabricated, for example potted electronic components.

9 Claims, No Drawings

FILLER FOR HEAT-CONDUCTIVE PLASTICS MATERIALS

The present invention relates to a mixture suitable as filler for the production of heat-conductive plastics materials, said mixture comprising two different fractions of aluminium nitride particles each having different particle diameters, to a formulation consisting of a plastics material and said filler, to an epoxy casting resin loaded with said filler, and to the use of said formulation as moulding material for the fabrication of moulded parts and composites.

Plastics materials are known to have poor thermal conductivity. To enhance their thermal conductivity, finely particulate metallic or mineral fillers are therefore blended into plastics materials. It is, however, only possible to use metallic fillers if no electrical insulating properties are required. Frequently used mineral fillers are quartz, amorphous silica, aluminium nitride or alumina, with which fillers it is usually possible to achieve a thermal conductivity of up to about 3.5 W/mK. Still higher conductivities require a high loading of these fillers, typically of up to about 80% by weight (c. 60% by volume). A high loading of filler, however, impairs the processing properties. To avoid abrasion in moulds it is expedient to use spherical particles. It is also known that abrasion can be reduced by choosing particles of small size; but this also results in a reduction of volume loading and hence of thermal conductivity.

In the Fifth IEEE SEMI-THERM ™ Symposium, San-Diego, pp. 126-130 (1989), P. Bujard et at. describe the use of AlN (aluminium nitride) particles of irregular shape and having a mean diameter of c. 30 $\mu$m as heat-conductive filler for anhydride-cured epoxy resins. The viscosity of the mixtures of Aln and the uncured epoxy resin increases rapidly at loadings from about 50% by volume. It is possible to achieve a loading of 62% by volume of AlN and a heat conductivity of 4.22 W/mK. Owing to the high viscosity, the formulation can only be processed with great difficulty because air pockets (bubble formation) are almost unavoidable. These formulations are unsuitable for technical use.

It has now been found that, in plastics materials containing high volume loadings of filler, it is possible to achieve higher thermal conductivities of 4 to more than 5 W/mK, the thermal coefficients of expansion being close to those of metals like copper, silver or gold, if the filler is a mixture of aluminium nitride fractions of different particle size and the AlN particles are sintered agglomerates. Surprisingly, it has also been found that this formulation makes it possible to achieve higher volume loadings of filler, and hence higher thermal conductivities, than with the individual fractions.

In one of its aspects, the invention accordingly relates to a powder mixture of aluminium nitride in the form of sintered agglomerates with fractions of different particle size, which mixture comprises
  (1) 80 to 50% by weight of aluminium nitride in the form of sintered agglomerates having a mean particle diameter of 30 to 50 $\mu$m, and
  (2) 20 to 50% by weight of aluminium nitride in the form of unsintered particles and having a mean particle diameter of 0.1 to 5 $\mu$m.

A preferred embodiment of the novel mixture comprises
  a) 77.5 to 55% by weight of component (1), and
  b) 22.5 to 45% by weight of component (2).

A still more preferred embodiment of the novel mixture comprises
  a) 75 to 60% by weight of component (1), and
  b) 25 to 40% by weight of component (2).

A particularly preferred embodiment of the novel mixture comprises
  a) 75 to 65% by weight of component (1), and
  b) 25 to 35% by weight of component (2).

The mean particle size of component (1) is preferably 35 to 45 $\mu$m, and the mean particle size of component (2) is preferably 1 to 2 $\mu$m.

The mean particle size of components (1) and (2) can be adjusted by the content of fractions of different particle sizes or by the choice of fractions having specific particle size ranges. Thus component (1) may typically comprise
  a) 4 to 40% by weight of AlN particles having a diameter of 50 to 100 $\mu$m,
  b) 35 to 70% by weight of AlN particles having a diameter of 20 to smaller than 50 $\mu$m, and
  c) 4 to 25% by weight of AlN particles having a diameter smaller than 20 $\mu$m, the percentages adding up to 100% by weight. The mixture preferably does not comprise particles having a diameter larger than 100 $\mu$m, but up to a maximum amount of 1% by weight of such particles, based on this total mixture, may be tolerated.

More preferably, component (1) comprises
  a) 10 to 35% by weight of AlN particles having a diameter of 50 to 100 $\mu$m,
  b) 45 to 70% by weight of AlN particles having a diameter of 20 to smaller than 50 $\mu$m, and
  c) 5 to 20% by weight of AlN particles having a diameter smaller than 20 $\mu$m, the percentages adding up to 100% by weight.

Still more preferably, component (I) comprises
  a) 20 to 35% by weight of AlN particles having a diameter of 50 to 100 $\mu$m,
  b) 55 to 70% by weight of AlN particles having a diameter of 20 to smaller than 50 $\mu$m, and
  c) 5 to 15% by weight of AlN particles having a diameter smaller than 20 $\mu$m, the percentages adding up to 100% by weight.

Component (2) preferably comprises particles having a diameter of 3 $\mu$m or smaller than 3 $\mu$m, typically 0.1 to 3 $\mu$m. The percentage amounts of component (2) and of component c) may overlap with respect to component c).

The novel mixtures can be prepared by mixing the components. Particulate aluminium nitrides in the form of sintered agglomerates are known and commercially available. Fractions having defined ranges of particle size are obtainable by conventional separation methods. Sintering methods for making agglomerated particles are also known. Particulate aluminium nitrides used as component (2) are known and commercially available. They are non-agglomerated particles.

The novel mixtures are admirably suitable for use as fillers to increase the thermal conductivity of polymers, and the abrasiveness of the formulation is of a low order.

In another of its aspects, the invention relates to a homogeneously blended formulation comprising
  a) 10 to 90% by weight of a thermoplastic or structurally crosslinked polymer, and
  b) 90 to 5% by weight of the previously described powder mixture.

The formulation will normally comprise preferably 10 to 90% by weight of polymer and 90 to 10% by weight of the powder mixture. Depending on the envisaged end use, the loading of the powder mixture in the polymer can vary. Thus in many moulder parts of which no very high thermal conductivity is expected, a loading of 5 to 50% by weight, preferably 10 to 40% by weight, of the powder mixture will meet the requirements of articles of use in respect of thermal conductivity. If it is desired to achieve a very high thermal conductivity, as of adhesives for bonding metal parts or casting resins for potting electrical or electronic components, the loading of the powder mixture will normally be more than 50% by weight, preferably 60 to 90% by weight and, most preferably, 70 to 90% by weight.

The thermoplastic polymers may conveniently be selected from among the following polymers, copolymers or mixtures of these polymers:

1. Polymers of monoolefins and diolefins, for example polypropylene, polyisobutylene, polybut-1-ene, poly-methylpent-1-ene, polyisoprene or polybutadiene, as well as polymers of cycloolefins, for example of cyclopentene or norbornene, polyethylene (which can be uncrosslinked or crosslinked), for example high density polyethylene (HDPE), low density polyethylene (LDPE), linear low density polyethylene (LLDPE), branched low density polyethylene (BLDPE).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, ethylene/hexene copolymers, ethylene/ethylpentene copolymers, ethylene/heptene copolymers, ethylene/octene copolymers, propylene/isobutylene copolymers, ethylene/but-1-ene copolymers, propylene/butadiene copolymers, isobutylene/isoprene copolymers, ethylene/alkyl acrylate copolymers, ethylene/alkyl methacrylate copolymers, ethylene/vinyl acetate or ethylene/acrylic acid copolymers and the salts thereof (ionomers), as well as terpolymers of ethylene with propylene and a diene, such as hexadiene, dicyclopentadiene or ethylidene-norbornene; and also mixtures of such polymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

3a. Hydrocarbon resins (for example $C_5$–$C_9$) including hydrogenated modifications thereof (for example tackifier resins).

4. Polystyrene, poly(p-methylstyrene), poly($\alpha$-methylstyrene).

5. Copolymers of styrene or $\alpha$-methylstyrene with dienes or acrylic derivatives, for example styrene/butadiene, styrene/acrylonitrile, styrene/alkyl methacrylate, styrene/maleic anhydride, styrene/butadiene/alkyl acrylate, styrene/butadiene/alkyl methacrylate styrene/acrylonitrile/methyl acrylate; mixtures of high impact strength from styrene copolymers and another polymer, for example from a polyacrylate, a diene polymer or an ethylene/propylene/diene terpolymer; and block copolymers of styrene, for example styrene/butadiene/styrene, styrene/isoprene/styrene, styrene/ethylene/butylene/styrene or styrene/ethylene/propylene/styrene.

6. Graft copolymers of styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed in 5), for example the copolymer mixtures known as ABS, MBS, ASA or AES polymers.

7. Halogen-containing polymers, such as polychloroprene, chlorinated rubbers, chlorinated or chlorosulfonated polyethylene, copolymers of ethylene and chlorinated ethylene, epichlorohydrin homo- and copolymers, polymers of halogenated vinyl compounds, for example polyvinyl chloride, polyvinylidene chloride, polyvinyl fluoride, polyvinylidene fluoride, as well as copolymers thereof, for example vinyl chloride/vinylidene chloride, vinyl chloride/vinyl acetate or vinylidene chloride/vinyl acetate copolymers.

8. Polymers derived from $\alpha,\beta$-unsaturated acids and derivatives thereof, for example polyacrylates and polymethacrylates, polymethyl methacrylate impact-modified with butyl acrylate, polyacrylamides and polyacrylonitrile.

9. Copolymers of the monomers mentioned in 8) with each other or with other unsaturated monomers, for example acrylonitrile/butadiene, acrylonitrile/alkyl acrylate, acrylonitrile/alkoxyalkyl acrylate or acrylonitrile/vinyl halide copolymers or acrylonitrile/ alkyl methacrylate/butadiene terpolymers.

10. Polymers derived from unsaturated alcohols and amines, or acyl derivatives thereof or acehals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1 ) above.

11. Homopolymers and copolymers of cyclic ethers, such as polyalkylene glycols, polyethylene oxide, polypropylene oxide or copolymers thereof with bisglycidyl ethers.

12. Polyacetals such as polyoxymethylene and those polyoxymethylenes which contain ethylene oxide as a comonomer, polyacetals modified with thermoplastic polyurethanes, acrylates or 1MBS.

13. Polyphenylene oxides and sulfides and mixtures thereof with styrene polymers or polyamides.

14. Polyurethanes derived from polyethers, polyesters or hydroxyl-terminated polybutadienes on the one hand and aliphatic or aromatic polyisocyanates on the other, as well as precursors thereof.

15. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides obtained by condensation of m-xylene diamine and adipic acid; polyamides prepared from hexamethylenediamine and isophthalic or/and terephthalic acid and optionally an elastomer as modifier, for example poly-2,4,4,-trimethylhexamethylene terephthalamide or poly-m-phenylene isophthalamide; and also copolymers of the aforementioned polyamides with polyolefins, olefin copolymers, ionomers or chemically bonded or grafted elastomers; or with polyethers, as with polyethylene glycols, polypropylene glycols or polytetramethylene glycols; polyamides or copolyamides modified with EPDM or ABS; polyamides condensed during processing (RIM polyamide systems).

16. Polyureas, polyimides, polyamide-imides and polybenzimidazoles.

17. Polyesters derived from dicarboxylic acids and diols and/or from hydroxycarboxylic acids or the corresponding lactones, such as polyethylene terephthalate, polybutylene terephthalate, poly-1,4-dimethylolcyclohexane terephthalate, poly[2,2,-(4-hydroxyphenyl)-propane]terephthalate and polyhydroxybenzoates as well as block copolyether esters derived from hydroxyl-terminated polyethers; and also polyester modified with polycarbonates or MBS.

18. Polycarbonates and polyester carbonates.

19. Polysulfones, polyether sulfones and polyether ketones.

20. Polyethers of digylcidyl compounds, typically diglycidyl ethers and diols, e.g. of the diglycidyl ether of bisphenol A and bisphenol A.

21. Natural polymers such as cellulose, rubber, gelatin and chemically modified homologous derivatives thereof, e.g. cellulose acetates, cellulose propionates and cellulose butyrates, or the cellulose ethers such as methyl cellulose; as well as rosins and their derivatives.

22. Blends of the aforementioned polymers (polyblends), for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPE/HIPS, PPE/PA 66 and copolymers, PA/HDPE, PA/PP, PA/PPO.

The structurally crosslinked polymers may be typically the following polymers:

1. Crosslinked polymers which are derived from aldehydes on the one hand and phenols, ureas and melamines on the other hand, such as phenol/formaldehyde resins, urea/formaldehyde resins and melamine/formaldehyde resins.

2. Drying and non-drying alkyd resins.

3. Unsaturated polyester resins which are derived from copolyesters of saturated and unsaturated dicarboxylic acids with polyhydric alcohols and vinyl compounds as crosslinking agents, and also halogen-containing modifications thereof of low flammability.

4. Crosslinkable acrylic resins derived from substituted acrylic esters such as epoxy acrylates, urethane acrylates or polyester acrylates.

5. Alkyd resins, polyester resins or acrylate resins which are cross-linked with melamine resins, urea resins, polyisocyanates or epoxy resins.

6. Rubber derived from crosslinked polydienes, for example butadiene or isoprene; silicon rubber.

7. Epoxy resins which are derived from polyepoxides, for example from bisglycidyl ethers or from cycloaliphatic diepoxides.

Among the crosslinked polymers, crosslinked epoxy resins are preferred which, as polyepoxides, are derived preferably from glycidyl compounds which contain on average two epoxy groups in the molecule. Particularly suitable glycidyl compounds are those which contain two glycidyl groups, B-methylglycidyl groups or 2,3-epoxycyclopentyl groups attached to a hetero atom (e.g. sulfur, preferably oxygen or nitrogen), in particular bis(2,3-epoxycyclopentyl) ether; diglycidyl ethers of polyhydric aliphatic alcohols, such as 1,4-butanediol, or polyalkylene glycols, such as polypropylene glycols; diglycidyl ethers of cycloaliphatic polyols, such as 2,2-bis(4-hydroxycyclohexyl)propane; diglycidyl ethers of polyhydric phenols, such as resorcinol, bis(p-hydroxyphenyl)methane, 2,2-bis(p-hydroxyphenyl)propane (=diomethane), 2,2-bis(4'-hydroxy-3 ',5'-dibromophenyl)propane, 1,3-bis(p-hydroxyphenyl)ethane; bis($\beta$-methylglycidyl) ethers of the above dihydric alcohols or dihydric phenols; diglycidyl esters of dicarboxylic acids, such as phthalic acid, terephthalic acid, $\Delta_4$-tetrahydrophthalic acid and hexahydrophthalic acid; N,N-diglycidyl derivatives of primary amines and amides and heterocyclic nitrogen bases which contain two N-atoms, and N,N'-diglycidyl derivatives of disecundary diamides and diamines, such as N,N-diglycidylaniline, N,N-diglycidyltoluidine, N,N-diglycidyl-p-aminophenyl methyl ether, N,N'-dimethyl-N,N'-diglycidylbis(p-aminophenyl)methane; N',N''-diglycidyl-N-phenyl-isocyanurate; N,N'-diglycidyl ethyleneurea; N,N'-diglycidyl-5,5-dimethylhydantoin, N,N'-diglycidyl-5-isopropyl-hydantoin, N,N-methylenebis-(N',N'-diglycidyl-5,5-dimethylhydantoin), 1,3-bis(N-glycidyl-5,5-dimethylhydantoin)2-hydroxypropane; N,N'-diglycidyl-5,5-dimethyl-6-isopropyl-5,6-dihydrouracil, triglycidyl isocyanurate.

A preferred group of epoxy resins comprises glycidylated novolaks, hydantoins, aminophenols, bisphenols and aromatic diamines or cycloaliphatic epoxy compounds. Particularly preferred epoxy resins are glycidylated cresol novolaks, diglycidyl ethers of bisphenol A and bisphenol F, hydantoin-N,N'-bisglycide, p-aminophenol triglycide, diaminodiphenylmethane tetraglycide, vinylcyclohexene dioxide, 3,4-epoxycyclohexylmethyl-3,4-epoxycyclohexanecarboxylate or mixtures thereof.

Further suitable epoxy resins are prereacted adducts of such epoxy compounds with epoxy hardeners, for example an adduct of the diglycidyl ether of bisphenol A and bisphenol A, or adducts which have been prereacted with oligoesters which carry two terminal carboxyl groups and epoxides.

Suitable hardeners for epoxy resins are acid or basic compounds. Illustrative examples of suitable hardeners are: amines, including aliphatic, cycloaliphatic or aromatic, primary, secondary and tertiary amines, typically ethylenediamine, hexamethylenediamine, trimethylhexamethylenediamine, diethylenetriamine, triethylenetetraamine, tetraethylenepentamine, N,N-dimethylpropylene-1,3-diamine, N,N-diethylpropylene-1,3-diamine, 2,2-bis(4'-aminocyclohexyl)propane, 3,3,5-trimethyl-3-(aminomethyl)cyclohexylamine (isophoronediamine), Mannich bases, including 2,4,6-tris(dimethylarninomethyl)phenol, m-phenylenediamine, p-phenylenediamine, bis(4-aminophenyl)methane, bis(4-aminophenyl)sulfone, xylylenediamine; amino alcohols such as aminoethanol, 1,3-aminopropanol, diethanolamine or triethanolamine; adducts of acrylonitrile with polyalkylenepolyamines or monoepoxides (ethylene oxide, propylene oxide) with polyalkylene polyamines (diethylenetriamine, triethylenetetramine; adducts of an excess of polyamines (diethylenetriamine, triethylenetetramine) and polyepoxides, typically diglycidyl ethers of bisphenol A; polyamides, preferably those from aliphatic polyamines (diethylenetriamine, triethylenetetramine) and di- or trimerised unsaturated fatty acids (dimerised linseed oil fatty acid, Versamid ®); dicyandiamide; polysulfides (Thiokol ®); aniline-formaldehydes; polyhydric phenols (resorcinol, 2,2-bis(4-hydroxyphenyl)propane) or phenol-formaldehyde resins; polybasic carboxylic acids and the anhydrides thereof, such as phthalic anhydride, tetrahydrophthalic anhydride, hexahydrophthalic anhydride, 4-methylhexahydrophthalic anhydride, 3,6-endomethylenetetrahydrophthalic anhydride, 4-methyl3,6-endomethylenetetrahydrophthalic anhydride (methylnadic anhydride), 3,4,5,6,7,7-hexachloroendomethylene-tetrahydrophthalic anhydride, succinic anhydride, adipic anhydride, trimethyladipic anhydride, sebacic anhydride, maleic anhydride, dodecylsuccinic anhydride, pyromellitic dianhydride, trimellitic anhydride, benzophenonetetracarboxylic dianhydride, or mixtures of such anhydrides.

A preferred group of hardeners comprises polyamines, novolaks, polyaminoamides and polycarboxylic anhydrides.

The epoxy resins can also be additionally cured with curing accelerators or only with thermal curing catalysts. Exemplary of curing accelerators and catalysts are tertiary amines, salts thereof or quaternary ammonium compounds (2,4,6-tris(dimethylarninomethyl)-phenol, benzyl dimethylamine, 2-ethyl-4-methylimidazole, triamylammonium phenolate; mono- or polyphenols (phenol, diomethane, salicylic acid); boron trifluoride and the complexes thereof with organic compounds, such as boron trifluoride ether complexes and boron trifluoride amine complexes (BF₃/monoethylamine complex); phosphoric acid and triphenylphosphite.

Curing accelerators and catalysts are normally added in an amount of 0. 1 to 10% by weight, based on the epoxy resin. Hardeners for epoxy resins are normally used in equimolar amounts, based on the epoxy groups and functional groups of a hardener.

Further additives for enhancing the processing properties, the mechanical, electrical and thermal properties, surface properties and light stability can be blended into the novel formulation. Exemplary of such additives are finely particulate fillers, reinforcing fillers, plasticisers, lubricants and mould release agents, adhesion promoters, antioxidants, heat and light stabilizers, pigments and dyes. The maximum concentration of additional fillers and/or reinforcing fillers concurrently used is conveniently, together with the novel powder mixture, not more than 95% by weight, preferably not more than 90% by weight, based on the formulation.

The novel formulation can be prepared by methods known in plastics technology, conveniently by blending the finely particulate thermally conductive filler with the polymer before or after its synthesis, by plasticizing the polymer and blending it with the filler by calendering, extrusion or injection moulding to prepare granulates or mouldings. It is also possible to make a dry blend of the powdered polymer with the filler or to suspend the filler in a solution of the polymer and then to remove the solvent.

When using thermoset resins and structurally cross-linked polymers, the finely particulate filler is conveniently added prior to shaping and to curing or crosslinking, typically by blending the resin components jointly with the filler, which may be incorporated beforehand in one component.

The novel powder mixture can be blended into the polymer in the form of the mixture itself or by the successive addition of individual components.

The novel mixture is especially suitable for the production of epoxy casting resins having a high volume loading of filler, such that moulded articles fabricated therefrom have thermal conductivities higher than 4 W/mK and even higher than 5 W/mK at fairly low temperature. Despite the high volume loading with filler, the viscosity of the casting resins is still so low that they are in some cases pourable when subjected to heat and/or vibration and can be readily processed to moulded articles, typically by compression moulding, casting or injection moulding methods.

The invention further relates to an epoxy casting resin formulation, which comprises a homogeneous blend of the epoxy resin with 70 to 90% by weight, preferably 75 to 90% by weight and, most preferably, 78 to 85% by weight, of the novel powder mixture of aluminium nitrides.

Suitable epoxy resins are those previously mentioned above. Preferred epoxy resins are those based on diglycidyl ethers or advanced diglycidyl ethers of bisphenols, for example diglycidyl ethers of bisphenol A and bisphenol F, and a polycarboxylic anhydride, typically phthalic anhydride and hydrophthalic anhydride, as hardener, which epoxy resins are preferably cured in the presence of a hardening accelerator such as N-methylimidazole.

The formulation of this invention is a useful moulding material for the fabrication of all kinds of thermally conductive moulded articles, including films, foils, ribbons, fibers, boards, semi-finished products, shaped articles and casings. The conventional techniques of plastics processing can be used, typically casting, calendering, injection moulding, extruding, deep drawing, compression moulding and sintering. The novel formulation is especially suitable for making heating elements, resin adhesives and hot melt adhesives, preferably for bonding metals, and also as thermally conductive sealing material, especially for electrical and electronic components.

In another of its aspects, the invention relates to the use of the novel formulation or of the novel casting resin for the fabrication of thermally conductive moulded parts and composites.

In yet another of its aspects, the invention relates to the use of the casting resin as resin adhesive for bonding metals or as sealing material for electrical and electronic components.

The following Examples illustrate the invention in more detail. The thermal conductivity is measured by the thermal comparison method using Pyroceram ® 9606 as reference material. The method is described by L. C. Hulstrom et al. in "Round-Robin Testing Of Thermal Conductivity Reference Materials", Proceedings of Thermal Conductivity 19, Oct. 20–23, 1985, Cookevelli, Tennesse, edited by D. W. Yarbrough.

EXAMPLES 1–8

The following aluminium nitrides are selected for the preparation of a casting resin (manufacturer: Hermann C. Starck, Berlin):

1. Type AlN K, spherical sintered AlN agglomerates consisting of
   a) 25% by weight of particles having a diameter of 50 to 100 $\mu$m,
   b) 65% by weight of particles having a diameter of 20 to 50 $\mu$m,
   c) 10% by weight of particles having a diameter of up to 20 $\mu$m. The mean particle diameter is 40 $\mu$m.
2. Type AlN C, AlN particles having a diameter 0.1 to 5 $\mu$m; mean particle diameter 1.4 $\mu$m.

The amounts of component 1 and component 2 indicated in the following Table are stirred in a polypropylene bottle for 7 hours and mixed (agitator with moveable blades). The powder mixture is homogeneously blended, with stirring, into an epoxy casting resin comprising 100 parts by weight of a diglycidyl ether of hisphenol F, 96 parts by weight of hexahydrophthalic anhydride and 0.4 part by weight of N-methylimidazole. The amount is measured such that the formulation is still pourable under vibration. The formulation is poured into an aluminium mould and thereafter cured for 4 hours at 80° C. and for 18 hours at 120° C. The loading of powder mixture is determined from the density and is indicated in Table 1, as is also the measured thermal conductivity.

TABLE 1

| Example No. | Ratio of AlN K/AlN C (wt. %/wt. %) | Loading (vol. %/wt.-%) | Conductivity (W/mK) |
|---|---|---|---|
| 1 | 80/20 | 59.8/80 | 4.1 |
| 2 | 75/25 | 61.8/81 | 5.05 |
| 3 | 74/26 | 63.9/82,3 | 4.9 |
| 4 | 72/28 | 61.8/81 | 5.3 |
| 5 | 70/30 | 62.3/81,3 | 4.5 |
| 6 | 65/35 | 62.8/81.6 | 5.2 |
| 7 | 60/40 | 61.3/80,6 | 4.8 |
| 8 | 55/45 | 60.3/80 | 4.4 |

EXAMPLE 9

The following casting resin is prepared with the AlN K/AlN C mixture of Example 3:

62 parts by weight of epoxy-cresol novolak,
31 parts by weight of cresol novolak,
0.75 part by weight of 2-phenylimidazole,
575 parts by weight of the AlN K/AlN C mixture of Example 3,
2 parts by weight of carbon black, and
1.4 parts by weight of Op wax.

The formulation is processed as described in Example 1 to test mouldings. The loading of AlN K/AlN C mixture is 69% by volume, the conductivity is 5.2 W/mK.

EXAMPLE 10

The procedure of Example 9 is repeated using 458 parts by weight of AlN K/AlN C mixture, 0.8 part by weight of carbon black and 1.1 parts by weight of Op wax. The loading of the AlN K/AlN C mixture is 65% by volume, and the conductivity is 3.6 W/mK.

What is claimed is:

1. A powder mixture of aluminium nitride in the form of sintered agglomerates with fractions of different particle size, which mixture consists essentially of
   (1) 80 to 50% by weight of aluminium nitride in the form of sintered agglomerates having a mean particle diameter of 30 to 50 $\mu$m, and
   (2) 20 to 50% by weight of aluminium nitride in the form of unsintered particles and having a mean particle diameter of 0.1 to 5 $\mu$m.

2. A mixture according to claim 1, which consists essentially of
   a) 77.5 to 55% by weight of component (1), and
   b) 22.5 to 45% by weight of component (2).

3. A mixture according to claim 1, which consists essentially of
   a) 75 to 60% by weight of component (1), and
   b) 25 to 40% by weight of component (2).

4. A mixture according to claim 1, which consists essentially of
   a) 75 to 65% by weight of component (1), and
   b) 25 to 35% by weight of component (2).

5. A mixture according to claim 1, wherein the mean particle size of component (1) is 35 to 45 $\mu$m, and the mean particle size of component (2) is 1 to 2 $\mu$m.

6. A mixture according to claim 1, wherein component (1) consists essentially of
   a) 4 to 40% by weight of AlN particles having a diameter of 50 to 100 $\mu$m,
   b) 35 to 70% by weight of AlN particles having a diameter of 20 to smaller than 50 $\mu$m, and
   c) 4 to 25% by weight of AlN particles having a diameter smaller than 20 $\mu$m, the percentages adding up to 100% by weight.

7. A mixture according to claim 6, wherein component (1) consists essentially of
   a) 10 to 35% by weight of AlN particles having a diameter of 50 to 100 $\mu$m,
   b) 45 to 70% by weight of AlN particles having a diameter of 20 to smaller than 50 $\mu$m, and
   c) 5 to 20% by weight of AlN particles having a diameter smaller than 20 $\mu$m, the percentages adding up to 100% by weight.

8. A mixture according to claim 1, wherein component (1) consists essentially of
   a) 20 to 35% by weight of AlN particles having a diameter of 50 to 100 $\mu$m,
   b) 55 to 70% by weight of AlN particles having a diameter of 20 to smaller than 50 $\mu$m, and
   c) 5 to 15% by weight of AlN particles having a diameter smaller than 20 $\mu$m, the percentages adding up to 100% by weight.

9. A mixture according to claim 1, wherein component (2) consists of particles having a diameter of 3 $\mu$m or smaller than 3 $\mu$m.

* * * * *